United States Patent
Baba et al.

(10) Patent No.: US 6,264,865 B1
(45) Date of Patent: Jul. 24, 2001

(54) SILICONE RUBBER BASE COMPOUND FOR ELECTRICAL WIRE COATING, SILICONE COMPOSITION FOR ELECTRICAL WIRE COATING, AND PROCESS FOR THE PRODUCTION OF SILICONE RUBBER COATED ELECTRICAL WIRE

(75) Inventors: Katsuya Baba; Kenji Ota, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/451,741

(22) Filed: Nov. 30, 1999

(30) Foreign Application Priority Data

Nov. 30, 1998 (JP) .................................................. 10-339975

(51) Int. Cl.[7] ............................. C08G 77/38; B29C 47/06
(52) U.S. Cl. .................... 264/173.12; 525/477; 525/478; 524/492; 264/176.1; 528/24
(58) Field of Search .................................... 525/477, 478; 524/492; 264/176.1, 173.12; 528/24

(56) References Cited

U.S. PATENT DOCUMENTS

| 4,743,671 | 5/1988 | Dorn et al. ............................. 528/24 |
| 5,246,982 | 9/1993 | Inoue et al. ........................... 523/212 |
| 5,705,588 | 1/1998 | Kreis et al. ............................ 528/24 |
| 5,925,709 | * 7/1999 | Takahashi et al. . |
| 5,973,058 | * 10/1999 | Baba et al. . |
| 6,011,105 | * 1/2000 | Ota et al. . |

FOREIGN PATENT DOCUMENTS

| 622 398 | 11/1994 | (EP) . |
| 826 734 | 3/1998 | (EP) . |
| 59-18758 | 1/1984 | (JP) . |
| WO 92/13694 | 8/1992 | (WO) . |

* cited by examiner

*Primary Examiner*—Robert Dawson
*Assistant Examiner*—Kuo-Liang Peng
(74) *Attorney, Agent, or Firm*—William F. Boley; Jennifer S. Warren; James L. De Cesare

(57) ABSTRACT

A silicone rubber base compound for electrical wire coating such that when it is extruded using an extruding machine having a variable screw with an L/D=10 and a die with a diameter of 1 mm attached thereto at a barrel and head temperature of 70° C., the per-minute extruder output rate at a screw rotation speed of 100 rpm is not less than 1.2 times the extruder output rate at a screw rotation speed of 50 rpm, a silicone rubber composition for electrical wire coating obtained by compounding diacyl organic peroxide consisting of carbon atoms, hydrogen atoms, and oxygen atoms with the silicone rubber base compound for electrical wire coating, and a process for the production of silicone rubber coated electrical wire using the silicone rubber composition for electrical wire coating.

1 Claim, No Drawings

SILICONE RUBBER BASE COMPOUND FOR ELECTRICAL WIRE COATING, SILICONE COMPOSITION FOR ELECTRICAL WIRE COATING, AND PROCESS FOR THE PRODUCTION OF SILICONE RUBBER COATED ELECTRICAL WIRE

BACKGROUND OF INVENTION

The present invention relates to a silicone rubber base compound for electrical wire coating, silicone rubber composition for electrical wire coating, and a process for the production of silicone rubber coated electrical wires.

Due to its superior heat resistance, cold resistance, weatherability, electrical characteristics, etc., silicone rubber has found many uses as a material for extrusion molding used for making tubing, tape, sheets, electrical wire coating, and the like. In the past, chlorinated organoperoxides, such as 2,4-dichlorobenzoyl peroxide and chlorobenzoyl peroxide, have been used as the curing agents for curing silicone rubber compositions using in such extrusion molding materials. However, the problem with silicone rubber compositions produced by adding these chlorinated organoperoxides is that they emit offensive odors in the process of curing and cause blooming on the surface of the moldings made of silicone rubber after curing. Blooming is a phenomenon where due to the gradual exudation of curing agent decomposition products on the surface of a molding its surface turns white. Silicone rubber compositions containing added bis(orthomethylbenzoyl) peroxide (Japanese Kokai (Unexamined) Patent Publication No. Sho 59{1984}-18758) and silicone rubber compositions containing added bis(paramethylbenzoyl) peroxide (Japanese Kokai (Unexamined) Patent Publication No. Sho 62{1987}-185750) as the curing agent have been suggested as a means to eliminate such problems. However the problem with these silicone rubber compositions is that their cure rate is slow and voids are liable to be generated in the silicone rubber and when these silicone rubber compositions are used as materials for electrical wire coating they have inferior electrical insulating properties, such as the increased frequency of arcing at high voltages. Although such problems are eliminated to a certain degree if the rate of output of the silicone rubber composition from the extruding machine is lowered and the heat curing time is made longer, the rate of production of silicone rubber coated electrical wires decreases resulting in the disadvantage of increased production cost.

The present inventors have arrived at the present invention as a result of in-depth investigations aimed at eliminating the above described problems. Namely, it is an object of the present invention to provide a silicone rubber base compound for electrical wire coating suitable for use as the main ingredient of a silicone rubber composition for electrical wire coating which is a silicone rubber coating material superior in moldability prior to curing and superior in electrical insulating properties after curing, a silicone rubber composition for electrical wire coating which is a silicone rubber coating material superior in moldability prior to curing and superior in electrical insulating properties after curing, and a process for the production of silicone rubber coated electrical wires.

SUMMARY OF INVENTION

A silicone rubber base compound for electrical wire coating such that when it is extruded using an extruding machine having a variable screw with an L/D=10 and a die with a diameter of 1 mm attached thereto at a barrel and head temperature of 70° C., the per-minute extruder output rate at a screw rotation speed of 100 rpm is not less than 1.2 times the extruder output rate at a screw rotation speed of 50 rpm, a silicone rubber composition for electrical wire coating obtained by compounding diacyl organic peroxide consisting of carbon atoms, hydrogen atoms, and oxygen atoms with the silicone rubber base compound for electrical wire coating, and a process for the production of silicone rubber coated electrical wire using the silicone rubber composition for electrical wire coating.

DESCRIPTION OF INVENTION

The present invention is a silicone rubber base compound for electrical wire coating, which is characterized in that when it is extruded using an extruding machine having a variable screw with an L/D=10 and a die with a diameter of 1 mm attached thereto at a barrel and head temperature of 70° C., the per-minute extruder output rate at a screw rotation speed of 100 rpm is not less than 1.2 times the extruder output rate at a screw rotation speed of 50 rpm, to a silicone rubber composition for electrical wire coating obtained by compounding a diacyl organic peroxide consisting of carbon atoms, hydrogen atoms, and oxygen atoms with said silicone rubber base compound, and to a process for the production of silicone rubber coated electrical wires.

The silicone rubber base compound for electrical wire coating of the present invention is the main ingredient of a silicone rubber composition for electrical wire coating and when it is extruded using an extruding machine having a variable screw with an L/D=10 and a die with a diameter of 1 mm attached thereto at a barrel and head temperature of 70° C., the per-minute extruder output rate at a screw rotation speed of 100 rpm is not less than 1.2 times, and, preferably, not less than 1.2 times and not more than 10 times, the extruder output rate at a screw rotation speed of 50 rpm. Here, if the per minute output rate at a screw rotation speed of 100 rpm becomes less than 1.2 times the output rate at a screw rotation speed of 50 rpm, a silicone rubber coating material superior in electrical insulating properties is not obtained. In addition, the extruding machine having a variable screw with an L/D of 10 and a die with a diameter of 1 mm attached thereto can be a device used in the testing or manufacture of silicone rubber coated electrical wires and may be either a testing device or a piece of production equipment.

The silicone rubber base compound of the present invention should satisfy the above described conditions and although there are no particular limitations concerning its type and such, it is preferable for it to have the composition described hereinbelow: (A) 100 parts by weight of an organopolysiloxane composition consisting of about 25 to 100 parts by weight of (A-1) organopolysiloxane polymer with a weight average molecular weight of less than 550,000 represented by the average unit formula $R_aSiO_{(4-a)}/2$, where R is a substituted or non-substituted monovalent hydrocarbon group, and a is a number of about 1.8 to 2.3, and 0 to about 75 parts by weight of (A-2) organopolysiloxane polymer with a weight average molecular weight of not less than 550,000 represented by the average unit formula: $R_aSiO_{(4-a)}/2$, where R is a substituted or non-substituted monovalent hydrocarbon group, and a is a number of about 1.8 to 2.3, and (B) about 10 to 100 parts by weight of fumed silica have a BET specific surface area of not more than 150 $m^2/g$.

To explain the preceding in greater detail, the organopolysiloxane composition of component (A) is the main component of the base composition of the present invention, and the organopolysiloxane polymer comprising component (A-1) forming part of component (A) must have a weight average molecular weight of less than 550,000, and, preferably, within a range of 250,000 to less than 550,000. Such organopolysiloxane polymers are represented by the average unit formula: $R_aSiO_{(4-a)}/2$, where R is a substituted or non-substituted monovalent hydrocarbon group exemplified by alkyl groups such as methyl, ethyl, and propyl; cycloalkyl groups such as cyclohexyl; alkenyl groups such as vinyl, allyl, butenyl, and hexenyl; aryl groups such as phenyl and tolyl; 3,3,3-trifluoropropyl, 2-phenylethyl, and 2-cyanoethyl. Also, a is a number of about 1.8 to 2.3. The molecular structure of this component is, preferably, substantially linear, but may be a structure having some branching. The weight average molecular weight of the organopolysiloxane polymer can be easily determined, for example, by gel permeation chromatography.

The organopolysiloxane polymer comprising component (A-2) must have a weight average molecular weight of not less than 550,000. In the same manner as the above described component (A-1), such organopolysiloxane polymer is represented by the average unit formula: $R_aSiO_{(4-a)}/2$, where R is a substituted or non-substituted monovalent hydrocarbon group exemplified by alkyl groups such as methyl, ethyl, and propyl; cycloalkyl groups such as cyclohexyl; alkenyl groups such as vinyl, allyl, butenyl, and hexenyl; aryl groups such as phenyl and tolyl; 3,3,3-trifluoropropyl, 2-phenylethyl, and 2-cyanoethyl. Also, a is a number of about 1.8 to 2.3. The molecular structure of this component is, preferably, substantially linear, but may have some branching. The weight average molecular weight of such organopolysiloxane polymer can be easily determined by gel permeation chromatography. The amount of this component is within the range of 0 to about 75 parts by weight, and, preferably, within the range of about 10 to 50 parts by weight, per about 25 to 100 parts by weight of component (A-1).

The fumed silica comprising component (B) used in the present invention is a component believed essential for imparting mechanical strength to the silicone rubber obtained by curing the composition of the present invention. Such fumed silica is a reinforcing silica having a BET specific surface area not more than 150 $m^2/g$, and, preferably, not less than 50 $m^2/g$ and not more than 150 $m^2/g$. In addition, fumed silica whose surface has been rendered hydrophobic by treatment with organochlorosilane, hexaorganodisilazane, diorganocyclopolysiloxane, and other organosilicon compounds can be used. The amount of this component is in the range of about 10 to 100 parts by weight per 100 parts by weight of component (A). This is due to the fact that when component (B) is less than 10 parts by weight, the mechanical strength of the silicone rubber decreases, and when it exceeds 100 parts by weight, compounding with component (A) becomes difficult.

Although the silicone rubber base compound for electrical wire coating used in the present invention can be readily prepared by homogeneously mixing the above described component (A) and component (B), it is preferable to knead them to homogeneity under heating. In addition to these components, various well-known additives conventionally added to silicone rubber compositions can be admixed therewith so long as this is not detrimental to the object of the present invention. Such additives are exemplified by diorganosiloxane oligomers endblocked by silanol groups at both terminals, hydroxyl-containing organosilane, hexaorganodisilazane and other agents preventing crepe hardening; diatomaceous earth, quartz powder, calcium carbonate, carbon black and other inorganic fillers; cerium hydroxide, cerium silanolate, fatty acid salts of cerium, and other agents imparting heat resistance; mold release agents, such as stearic acid, zinc stearate, calcium stearate, and other fatty acids and metal salts thereof; pigments, flame retarders, and agents imparting electrical conductivity. Here, it is preferable that agents preventing crepe hardening should comprise about 5 to 50 Wt. % of component (B).

The silicone rubber composition for electrical wire coating of the present invention is obtained by compounding (C) diacyl organic peroxides consisting of carbon atoms, hydrogen atoms, and oxygen atoms as a curing agent with the above described silicone rubber base compound for electrical wire coating. Such organic peroxides comprising component (C) are exemplified by bis(orthomethylbenzoyl) peroxide; bis(metamethylbenzoyl) peroxide; bis(paramethylbenzoyl) peroxide and other monomethyl benzoyl peroxides; bis(2,4-ethylbenzoyl) peroxide and other dimethyl benzoyl peroxides; bis(2,4,6-trimethylbenzoyl) peroxide and other trimethyl benzoyl peroxides; and benzoyl peroxide. Among these, methyl-substituted benzoyl peroxides are preferable. The amount of this component is within the range of about 0.05 to 10 parts by weight, and, preferably, within the range of about 0.1 to 5 parts by weight, per 100 parts by weight of the above described component (A).

The process for the production of silicone rubber coated electrical wires of the present invention is characterized in that the above described silicone rubber composition for electrical wire coating is charged to an extruding machine and a core wire is coated with the silicone rubber composition, whereupon said silicone rubber composition-coated electrical wire is introduced into a heating oven whose temperature has been set to about 200° C. to 600° C. to cure the aforementioned silicone rubber composition. Here, in order to coat the core wire with the silicone rubber composition, it is preferable to use a process, in which the silicone rubber composition is extruded from the extruding machine used for electrical wire coating simultaneously with coating the core wire, which is immediately followed by heating and curing it in a hot-air oven. Here, well-known conventional equipment used in the production of silicone rubber coated electrical wires can be utilized as the extruding machine for electrical wire coating. In addition, the temperature, at which the silicone rubber composition is cured in hot air, is within the range of about 200° C. to 600° C., with 250° C. to 500° C. being preferable.

The present invention is explained by referring to the following application examples and comparative examples. In the examples, the term "parts" refers to parts by weight. In addition, the weight average molecular weight of the organopolysiloxane polymers was measured in accordance with the method described below.

Measurement of weight average molecular weight of organopolysiloxane polymers:

Test samples for gel permeation chromatography were prepared by dissolving the organopolysiloxane polymer in toluene. Next, the weight average molecular weight of the samples was measured using a gel permeation chromatograph "HLC-802A" from Toyo Soda Co., Ltd. The calculation of the weight average molecular weight was carried out using a standard sample of polystyrene for reference. Therefore, the molecular weight of the resultant organopolysiloxane polymer is weight average molecular weight as converted to polystyrene.

APPLICATION EXAMPLE 1

25 Parts organopolysiloxane polymer endblocked with dimethylvinylsiloxy groups at both terminals, which consisted of 99.6 mol % (mole percent) dimethylsiloxane units and 0.4 mol % methylvinylsiloxane units and had a weight average molecular weight of 520,000, 75 parts organopolysiloxane polymer endblocked by dimethylvinylsiloxy groups at both terminals, which consisted of 99.6 mol % dimethylsiloxane units and 0.4 mol % methylvinylsiloxane units and had a weight average molecular weight of 590,000, 10 parts dimethylsiloxane oligomer endblocked by silanol groups at both terminals, whose viscosity at 25° C. was 10 mPa.s, and 45 g fumed silica with a BET specific surface area of 130 m$^2$/g were charged to a kneader mixer and kneaded to homogeneity at 120° C. After cooling, 8 parts diatomaceous earth, 0.8 part cerium oxide, 1 part zinc oxide powder, and 0.3 part zinc stearate were charged thereto and kneaded to homogeneity, obtaining a silicone rubber base compound.

The silicone rubber base compound was charged to a Labo Plastomill® (from K.K. Toyo Seiki Seisaku-Sho Co., Ltd.) having a variable screw with an L/D=10 and a die with a diameter of 1 mm attached thereto, followed by measuring the extruder output rate at a screw rotation speed of 50 rpm and extruder output rate at a screw rotation speed of 100 rpm at a barrel and head temperature of 70° C. As a result, it was determined that the per-minute extruder output rate at 100 rpm was 1.26 times the per-minute extruder output rate at 50 rpm.

Subsequently, 1.3 parts of 50 wt % silicone oil paste of bis(paramethylbenzoyl) peroxide was added to 100 parts of this silicone rubber base compound and kneaded using a 2-roll mill, producing a silicone rubber composition for electrical wire coating. The silicone rubber composition was charged to a 65-mm diameter single screw extruding machine used for electrical wire coating, and a core wire with a diameter of 0.7 mm was coated with the silicone rubber composition in the cross head. Subsequently, the silicone rubber composition-coated electrical wire was drawn at a rate of 40 m/min through a heating oven with a length of 7.2 m maintained at a temperature of 400° C., producing a silicone rubber coated electrical wire with a wall thickness of 0.8 mm. When the silicone rubber coated electrical wire was passed through a arc tester at a voltage of 5 kV, no arcing occurred within 5,000 m.

APPLICATION EXAMPLE 2

With the exception of changing all types of organopolysiloxane polymers in Application Example 1 to organopolysiloxane polymer endblocked with dimethylvinylsiloxy groups at both terminals with a weight average molecular weight of 520,000, a silicone rubber base compound and a silicone rubber composition were produced in the same manner as in Application Example 1. When the rate of output of the silicone rubber base compound extruded from the Labo Plastomill was measured in the same manner as in Application Example 1, the extruder output rate at 100 rpm was 1.34 times the extruder output rate at 50 rpm. A silicone rubber coated electrical wire was produced using this silicone rubber composition in the same manner as in Application Example 1, and when it was passed through an arc tester at a voltage of 5 kV, no arcing occurred within 5,000 m.

COMPARATIVE EXAMPLE 1

With the exception of changing 10 parts of organopolysiloxane polymer with an weight average molecular weight of 520,000 in Application Example 1 to 90 parts of organopolysiloxane polymer with an weight average molecular weight of 590,000, a silicone rubber base compound and a silicone rubber composition were produced in the same manner as in Application Example 1. When the rate of output of the silicone rubber base compound extruded from the Labo Plastomill was measured in the same manner as in Application Example 1, the extruder output rate at 100 rpm was 1.17 times the extruder output rate at 50 rpm. A silicone rubber coated electrical wire was produced using this silicone rubber composition in the same manner as in Application Example 1, and when it was passed through an arc tester at a voltage of 5 kV, arcing occurred twice within 5,000 m.

COMPARATIVE EXAMPLE 2

With the exception of compounding fumed silica with a BET specific surface area of 200 m$^2$/g instead of the fumed silica with a BET specific surface are of 130 m$^2$/g as used in Application Example 1, a silicone rubber base compound and a silicone rubber composition were produced in the same manner as in Application Example 1. When the rate of output of the silicone rubber base compound extruded from the Labo Plastomill was measured in the same manner as in Application Example 1, the extruder output rate at 100 rpm was 1.12 times the extruder output rate at 50 rpm. A silicone rubber coated electrical wire was produced using this silicone rubber composition in the same manner as in Application Example 1, and when it was passed through an arc tester at a voltage of 5 kV, arcing occurred 4 times within 5,000 m.

What is claimed is:

1. A process for making a silicone rubber coated electrical wire comprising
    (A) feeding to an extruder a silicone rubber composition for electrical wire coating comprising about 0.05 to 10 parts by weight of diacyl organic peroxide consisting of carbon atoms, hydrogen atoms, and oxygen atoms per 100 parts by weight of the silicone rubber composition and which silicone rubber composition is characterized in that when it is extruded using an extruder having a screw with an LID=10 and a die with a diameter of 1 mm attached thereto at a barrel and head temperature of 70° C., the per-minute extruder output rate at a screw rotation speed of 100 rpm is not less than 1.2 times the extruder output rate at a screw rotation speed of 50 rpm and coating an electrical wire with the silicone rubber composition by co-extrusion and
    (B) introducing the silicone rubber composition-coated electrical wire into a heating oven having a temperature of about 200° C. to 600° C. to cure the silicone rubber composition.

* * * * *